United States Patent [19]

Miki

[11] Patent Number: 4,989,135
[45] Date of Patent: Jan. 29, 1991

[54] COMMUNICATION CONTROL MICROCOMPUTER

[75] Inventor: Sakae Miki, Tokyo, Japan
[73] Assignee: Hitachi, Ltd., Tokyo, Japan
[21] Appl. No.: 534,350
[22] Filed: Jun. 5, 1990

Related U.S. Application Data

[63] Continuation of Ser. No. 156,313, Feb. 16, 1988.

[30] Foreign Application Priority Data

Feb. 16, 1987 [JP] Japan ................. 62-31456

[51] Int. Cl.⁵ ................. G06F 3/00; G06F 13/00
[52] U.S. Cl. ................. 364/200; 364/900;
364/238.3; 364/242.3; 364/239.2; 364/260.1;
364/939.5; 364/939.3; 364/927.97; 364/927.98;
364/932.8; 364/940.62
[58] Field of Search ... 364/200 MS File, 900 MS File;
370/60

[56] References Cited

U.S. PATENT DOCUMENTS

| | | | |
|---|---|---|---|
| 4,181,938 | 1/1980 | Suzuki et al. | 364/200 |
| 4,342,078 | 7/1982 | Tredennick et al. | 364/200 |
| 4,371,926 | 2/1983 | Yamaura et al. | 364/200 |
| 4,417,304 | 11/1983 | Dinwiddie, Jr. | 364/200 |
| 4,748,656 | 5/1988 | Gibbs et al. | 364/900 |
| 4,782,439 | 11/1988 | Borkar et al. | 364/200 |
| 4,807,112 | 2/1989 | Hamasaki | 364/200 |

OTHER PUBLICATIONS

"NEC Electronic Device uPD70201A User's Manual", published in 1984 by Nippon Electric Co., Ltd., pp. 1-5 and pp. 24-27. (Japanese Version and English Translation of these pages enclosed.)

*Primary Examiner*—Allen R. MacDonald
*Assistant Examiner*—Gopal C. Ray
*Attorney, Agent, or Firm*—Fay, Sharpe, Beall, Fagan, Minnich & McKee

[57] ABSTRACT

Disclosed is a communication control microcomputer which includes components that implement serial communication control in compliance with a communication protocol, a FIFO memory for temporarily holding transaction data, a direct memory access control (DMAC) for implementing DMA transfer between the FIFO memory and the main memory, and a CPU for implementing general control over these components. A signal indicating end of frame (transaction data) is passed between components that control the serial communication and the DMAC through the FIFO memory.

17 Claims, 4 Drawing Sheets

COMMUNICATION CONTROL MICROCOMPUTER

This is a continuation of application Ser. No. 156,313, filed Feb. 16, 1988.

BACKGROUND OF THE INVENTION

The present invention relates to the communication control technology and, particularly, to the technique which is effectively applied to the serial data communication among microprocessors, e.g., effectively applied to communication control units used in a local area network.

Figure 5:
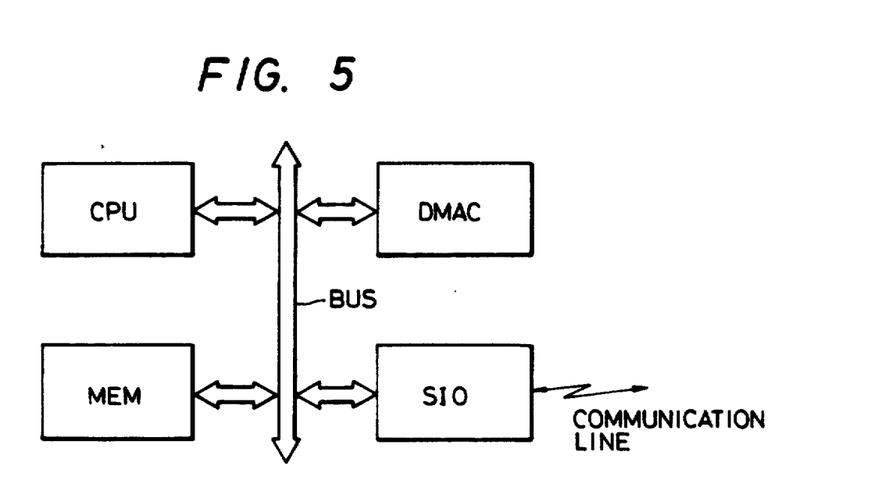
FIG. 5 is a block diagram showing the system arrangement using the conventional communication LSI (SIO).

For carrying out the serial data communication among microprocessors, there are provided communication LSIs such as type µPD7201A manufactured by Nippon Electric Co., Ltd. FIG. 5 shows an example of systems using the communication LSI µPD7201A. The microprocessor has its CPU connected through a system bus (BUS) with a memory (MEM), DMA controller (DMAC) and serial communication LSI (SIO).

In this system, when the CPU intends to transmit data to another microprocessor (not shown), the CPU sends a transfer start command to the DMA control (DMAC). The DMA controller (DMAC) responds to the transfer request signal from the communication LSI (SIO) to provide the address on the system bus (BUS), read out the intended transmission data from the memory (MEM) and delivers it to the communication LSI (SIO). The transmission data supplied to the communication LSI (SIO) is stored temporarily in the internal FIFO and, after being converted into serial data, it is sent to the external microprocessor.

When the communication LSI (SIO) has received data from outside, it is converted into bytewise parallel data and stored in a receiving FIFO. After receiving notification of the received data, the CPU issues a transfer start command to the DMA controller (DMAC), and the DMAC responds to the transfer request signal from the communication LSI (SIO) to transfer the received data in the FIFO to the memory (MEM). Thereafter, the CPU makes access to the memory (MEM) to fetch the received data. (Refer to "NEC Electronic Device µPD7201A User's Manual" published in 1984 by Nippon Electric Co., Ltd.)

In the above-mentioned system, the SIO and DMAC operate independently. For example, when the SIO has received data, it signals the CPU, and then the CPU issues a command to the DMAC so that DMA transfer is started. Upon receiving a frame of data, the SIO informs the CPU, which then directs the DMAC to halt. Similarly, at transmission, starting and ending of data transfer is sent to the CPU, and the SIO and DMAC are controlled independently on the CPU command level.

Accordingly, the conventional system needs CPU intervention at each transmission or reception of frame data, and this results in an excessive load to the CPU and a slower protocol processing.

SUMMARY OF THE INVENTION

It is an object of the present invention to reduce the load of CPU in communication units which constitute a local area network, thereby enhancing the protocol processing speed.

These and other objects and novel features of the present invention will become more apparent from the following description of a specific embodiment taken in conjunction with the accompanying drawings.

The present invention resides in the communication control unit including a communication control circuit which implements serial communication control in accordance with a communication protocol, a buffer memory of the first-in-first-out (FIFO) type for temporarily holding transmission and reception data, a DMA control circuit for implementing DMA transfer between the FIFO and a data buffer (memory) on the part of the host computer, and a controller (CPU) for controlling these components, wherein a signal indicating the end of frame (of transmission or reception data) is passed between the serial communication control circuit and the DMA control circuit by way of the FIFO.

This control scheme enables the receiver (serial communication control circuit or DMA control circuit) to terminate the data receiving operation automatically upon detecting the signal appended to data without the intervention of controller, whereby the controller is relieved of this load and the above objective of improving the protocol processing speed can be achieved.

DESCRIPTION OF THE PREFERRED EMBODIMENTS

The following describes an embodiment of the present invention applied to the communication control LSI used for a local area network which complies with SDLC (Synchronous Data Link Control) protocol.

Figure 1:
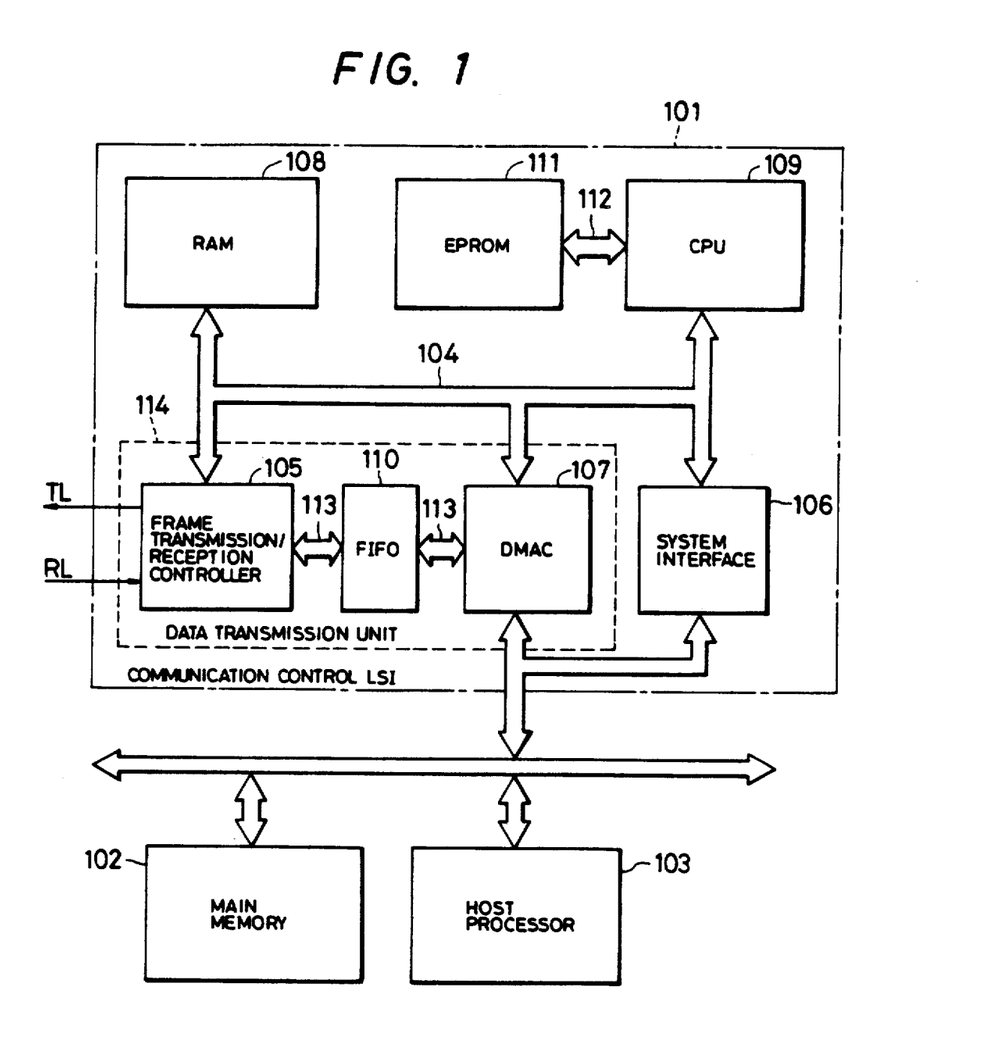
FIG. 1 is a block diagram of the communication controller which includes the communication control LSI embodying the present invention.

FIG. 1 shows in block diagram the system arrangement of the communication controller which includes the communication control LSI embodying the present invention. The communication control LSI 101 shown in the figure is formed on a single semiconductor substrate based on the known semiconductor integrated circuit fabricating technology, although it is not limited to this type of device.

The communication control LSI 101 constitutes a certain communication functional interface or conjunction with a main memory 102 and host processor 103, and operates to support the data transmission control procedure and other control in carrying out data communication with an external partner communication functional module.

The communication LSI 101 has an internal common bus 104 connecting a frame transmission/reception control 105 which is provided as a communication control means implementing serial interface with the partner station through a transmission line TL and reception line RL, a system interface section 106 interfacing with the main memory 102 and host processor 103 within the self station, a DMAC (direct memory access controller)

107 for implementing direct data transfer with the main memory 102 and the like without using the system interface section 106, a RAM (random access memory) 108 for storing, in a rewritable fashion, various control data such as system constants necessary for the data transmission control, and a central processing unit 109 for implementing control over the whole communication control LSI 101.

The frame transmission/reception controller 105 generates bit synchronization and character synchronization for serial data received on the reception line RL, converts the serial data into parallel, and detects transmission errors, while substantially simultaneously signalling the central processing unit 109 to execute a certain interrupt process. The process executed depends on the received data and type of reception frame. At data transmission, the controller 105 performs parallel-to-serial conversion of data or frame to be transmitted, appends transmission error detecting codes to the data and sends it over the transmission line TL, while generating bit synchronization and character synchronization.

The DMAC 107 controls the data transfer of certain fields of received data or frame, which have been processed by the frame transmission/reception controller 105, to the main memory 102. The DMAC 107 also controls the transfer of data stored in the main memory 102 to the frame transmission/reception controller 105, as well as controlling the transfer of various parameters and table data necessary for the communication protocol process, between the main memory 102 and RAM 108.

For data transfer controlled by the DMAC 107 between the frame transmission/reception controller 105 and main memory 102, a specific DMA-transfer bus 113 connecting the DMAC 107 and frame transmission/reception controller 105 is used, although the data transfer is not confined to this. By this scheme, data transfer under access control by the DMAC 107 between the frame transmission/reception controller 105 and main memory 102 does not occupy the internal common bus 104, allowing the central processing unit 109 to use the bus 104 for control of the communication protocol process during the DMA transfer.

Provided between the frame transmission/reception controller 105 and DMAC 107 is a first-in-first-out (FIFO) data buffer 110, which function to absorb the difference between the data transfer rate under control of DMAC 107 and the data transmission/reception rate of the fram transmission/reception controller 105.

The system interface section 106 is used by the host processor 103 for transferring commands to the communication control LSI 101 or reading the internal status of the communication control LSI 101.

The communication control LSI is equipped with a communication protocol processing program which prescribes the data transmission control procedure, and this program is stored in an EPROM (erasable and programmable read-only memory) 111 which is an example of rewritable nonvolatile semiconductor memory. Accordingly, by selecting or modifying a communication protocol processing program in the EPROM 111 depending on the need, the communication control LSI can incorporate a desired data transmission control procedure in correspondence to various protocols.

The EPROM 111 may be replaced with an EEPROM (electrically erasable and programmable read-only memory) which allows rewriting in the electrical manner. In this case, the data transmission control procedure can be rewritten on the system level. Accordingly, when the frame transmission/reception controller 105 is intended for a use which utilizes different protocols such as LAPB and LAPD, or control procedures of other HDLC systems, it is possible to provide selective transmission control procedures external to the communication control LSI, and to up-load a necessary control procedure into the EEPROM. In addition, when alteration or modification of communication protocol is needed after the system has been completed, the protocol processing program can be rewritten or modified on the system level.

Protocol processing programs stored in the EPROM 111 are formed of microinstructions, although they are not confined to this scheme. The microinstructions include microcodes and various information fields in certain numbers of bits so that various arithmetic-logic operations and data transfer operations are executed in certain numbers of cycles or certain numbers of steps.

The EPROM 111 is accessed by the central processing unit 109, and microinstructions read out of the EPROM 111 are delivered to the central processing unit 109 over a specific command bus 112.

The central processing unit 109 consists of a micro address controller for providing access to the EPROM 111, a micro instruction decoder for decoding microinstructions supplied from the EPROM 111, an execution unit for executing microinstructions controlled by the control signals provided by the micro instruction decoder, a bus interface unit coupled to the internal common bus 104, and an interupt controller, although the arrangement is not confined to this, and it implements data transmission control in compliance with the specified communication protocol.

Figure 2:
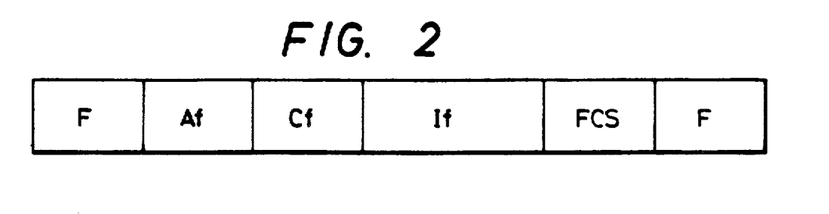
FIG. 2 is a diagram showing the format of frames to be transmitted or received.

For example, in case a communication protocol processing program for prescribing the LAPD control procedure for ISDN which belongs to the HDLC control procedure system or a like control procedure is stored in the EPROM 111, the basic format of frames dealt with by the frame transmission/reception controller 105 is shown in FIG. 2. This frame format is basically the same as that of general HDLC control procedures, with the only difference being the byte arrangement for certain fields. The frame format consists of a 1-byte flag F indicating the start of frame, a 2-byte address field Af indicating the self or partner station, a 2-byte control field Cf indicating the type of frame, an information field If with an integral number of bytes, and a frame check sequence FCS made up of 2-byte code appended in the frame for transmission error verification. Types of frames prescribed by the control field Cf include a link setup request (SUBME), link setup request acknowledge (UA), information (I), receive-ready (RR) indicating readiness to receive frames after link establishment, receive-not-ready (RNR) indicating incomplete readiness to receive frames after link establishment, and reject (REJ) of frame reception, although types are not confined to these.

For example, in the communication control LSI which contains the LAPD control procedure for ISDN in the EPROM 111, the frame transmission/reception controller 105 decodes data or frame supplied thereto and goes on processing for the address included in it or information included in the control field, and at the same time stores frame information, i.e., information in received frames or information to be transmitted which is transferred from the main memory by way of the DMAC 107, in the data buffer (FIFO) 110.

At this time, the frame transmission/reception controller 105 issues various interrupts to the central processing unit 109 in accordance with the address and information included in the control field. The central processing unit 109 generates a vector depending on type of the immediate interrupt to execute the appropriate set of microinstructions. For example, in case of receiving an information frame, the error detection computation is compared to the frame check sequence FCS, and upon verification of accurate frame reception the DMAC 107 is activated so that the address field Af, control field Cf and information field If of the received data stored in the data buffer (FIFO) 110 are transferred to the main memory 102 by way of the DMAC 107. In another case of transmitting an information frame, the address field Af, control field Cf and information field If placed in the data buffer (FIFO) 110 are preceded with the frame start flag F, while the frame check sequence FCS and frame end flag F are appended to complete a frame. This frame is transmitted by the frame transmission/reception controller 105.

Figure 3:
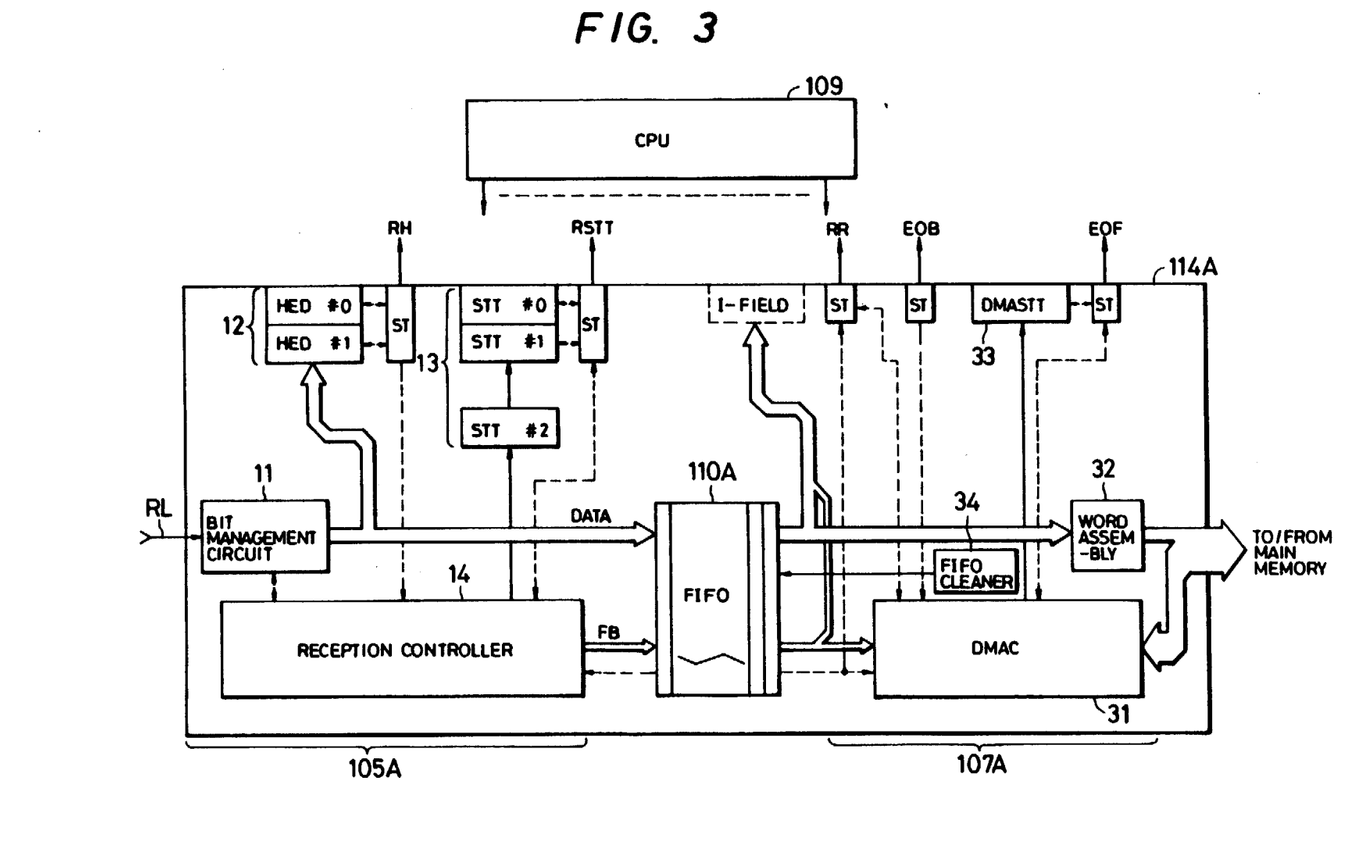
FIG. 3 is a block diagram of the receiving data transfer unit within the data communication unit 114 shown in FIG. 1.
Figure 4:
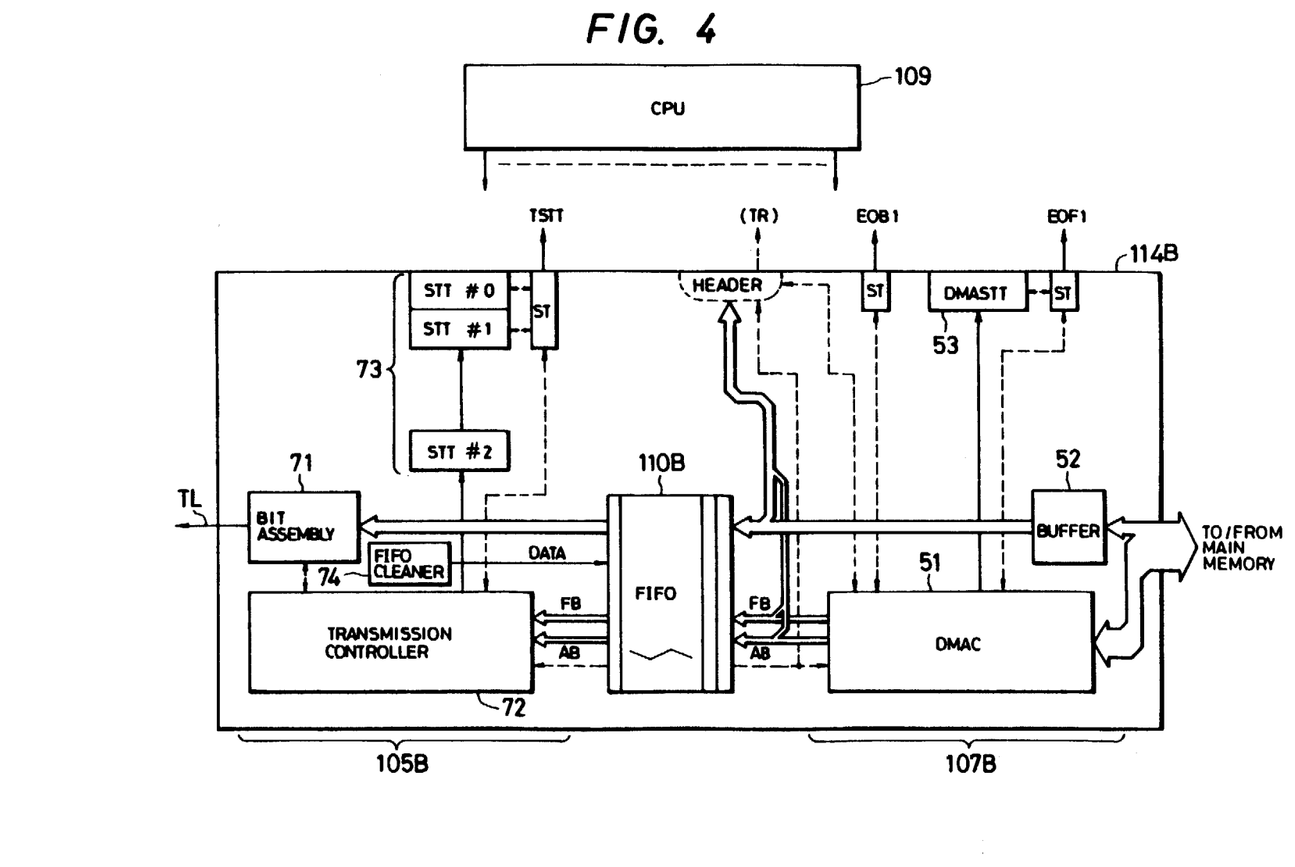
FIG. 4 is a block diagram of the sending data transfer unit within the data communication unit 114 showin in FIG. 1.

In the communication control LSI of this embodiment, the data communication unit 114 made up of the frame transmission/reception controller 105, data buffer (FIFO) 110 and DMAC 107 incorporates therein a receiving data transfer unit 114A and a sending data transfer unit 114B each arranged as shown in FIG. 3 and FIG. 4, respectively.

First, the arrangement of the receiving data transfer unit 114A shown in FIG. 3 will be described. The receiving data transfer unit of this embodiment consists of a frame receiver 105A which receives a frame on the data reception line RL, decomposes the frame into fields according to the communication protocol and produces the reception status signal, a FIFO 110A which latches pieces of data in the information field of the received frame, and a DMA transfer controller 107A which transfers received data in the FIFO 110A to the data buffer (main memory 102) provided in the host computer. The CPU 109 incorporated in the same LSI chip implements general control over these circuit components. The CPU 109 consists of a micro controller based on microprogram control system, and other components.

The frame receiver 105A consists of a bit processing circuit 11 which detects the start of frame flag in the received frame and forms bytewise parallel data from the serial data in the information field, FIFO header registers 12 for storing headers (the data content of the address field and control field) separated from the received frame, status registers 13 for holding the reception status signals produced for each received frame, and a reception control circuit 14 which decomposes the received frame, produces the reception status signals and produces the interrupt signals RH and RSTT to the CPU 109.

The interrupt signal RH (header ready) is used to indicate the CPU 109 that a frame has arrived and that the address field and control field has been decomposed and that the data in the information field are transferred to the FIFO 110A. The interrupt signal RSTT is used to indicate to CPU 109 that an error has been detected during the frame reception.

Upon receiving a frame, information from the address field Af and control field Cf of the frame is stored in header register HED#0. In response to this operation, the interrupt signal RH is produced by the status detecting circuit ST. Receiving the interrupt signal RH, the CPU 109 reads the header register HED#0. Subsequently, the header register HED#0 has its content updated to the content of header register HED#1, i.e., information based on the address field Af and control field Cf of the next frame received. At this point, the status register STT#0 stores information based on the field FCS of the first frame, and the status register STT#1 stores information based on the field FCS of the second frame. The status register STT#0 is read out by the CPU 109 in response to the interrupt signal RSTT. Thereafter, the status register STT#0 is updated to the content of the status register #1. Accordingly, the contents of header register HED#0 and status register STT#1 include information pertinent to the same frame, and the contents of header registers HED#1 and status register SST#2 include information pertinent to the same frame received next. Because of this feature, in this embodiment, there is one more status register 13 than the header registers 12 so that during the processing of one received frame, the following two frames can be received.

The bit management circuit 11 detects the flags indicating the start and end of a frame and removes filler bits of "0" that have been inserted for the purpose of prior recognition of the type of data transferred in serial fashion, under sequence control of the reception controller 14.

Incoming frames in excess of the limit of received frame protection are ignored, but in this case the reception controller 14 issues signal (not shown) to the CPU 109. Correspondingly, the FIFO 110A has multiple stages, such as 20 stages, so that it can store several frames of data. Moreover, in this embodiment, received data stored in the FIFO 110A can be cleared (eliminated) for each frame by means of a FIFO cleaner 34 provided in the DMA transfer controller 107A.

The FIFO 110A is designed to produce an interrupt signal RR (data ready) which indicates that data to be processed by the CPU 109 is ready at the FIFO output port. In this case, when information field data of newly arriving frame is ready on the output port in the FIFO 110A, it interrupts the CPU 109 using the data ready signal RR. When the CPU 109 activates the DMA transfer controller 107A the data ready signal RR goes off, and is not reasserted until the data of the next frame is available at the FIFO 110A output port.

The DMA transfer controller 107A consists of the above-mentioned FIFO cleaner 34, a word assembly circuit 32 which reforms wordwise packet data from bytewise transmission data read out of the FIFO 110A, a status register 33 for holding the DMA transfer status signals, and a DMA control circuit 31 which implements DMA transfer control, monitors the buses to produce DMA transfer control status signals such as BUS ERROR, and produces the interrupt signals EOB and EOF to the CPU 109. The interrupt signal EOB is used to indicate to the CPU 109 that the host computer is out of data buffer and necessitates a next buffer. The interrupt signal EOF is used to indicates to the CPU 109 that a frame of received data in the FIFO 110A has been transferred or DMA transfer has aborted due to a bus error or the like.

Furthermore, in this embodiment, upon detection of the last data in the incoming frame, the reception controller 14 produces the final data indication signal FB (an "end-of-data indicator" or final bit) and sends it with the last data to the FIFO 110A. When the DMA control circuit 31 receives the final bit FB during the DMA transfer for FIFO data, it halts DMA transfer irrespective of a command from the CPU 109, and conversely issues a frame transfer end interrupt signal EOF to the CPU 109.

Conventional communication control LSIs intended for the similar protocol processing are designed such that a communication controller (SIO) interrupts the microprocessor upon completion of one frame transfer and the microprocessor directs the DMA transfer control circuit to halt, whereas in the foregoing embodiment the DMA transfer control is halted without the intervention of CPU 109. Consequently, the load of the microprocessor (CPU 109) is reduced and the protocol processing speed is enhanced.

Next, the arrangement of the sending data transfer unit 114B shown in FIG. 4 will be described. The sending data transfer unit of this embodiment consists of a DMA transfer controller 107B which retrieves transmission data from the data buffer of the host computer and implements DMA transfer, a FIFO 110B which holds a series of DMA-transferred transmission data, a frame transmitter 105B which converts the transmission data held in the FIFO 110B into serial data to form a transmission frame and sends it out over the communication line, and a CPU 109 for implementing general control over these components.

The DMA transfer controller 107B consists of a buffer 52 which temporarily holds wordwise transmission data which has been read out of the data buffer of the host computer and transfers it bytewise to the FIFO 110B, a status register 53 for holding DMA transfer status signals, and a DMA control circuit 51 which implements DMA transfer control, monitors the buses to produce DMA transfer status signals such as BUS ERROR, and produces interrupt signals EOB1 and EOF1 to the CPU 109. The interrupt signal EOB1 is used to request a next data buffer to the CPU 109 when data transfer in the specified data buffer has completed. The interrupt signal EOF1 is used to indicate to the CPU 109 that a frame of transmission data has been transferred.

The FIFO 110B has 20 stages, as did FIFO 110A in the receiving unit, so that it can hold several frames of transmission data, and produces an interrupt signal TR indicating that the input port of the FIFO 110B is ready to receive data from the CPU 109. In response to this interrupt signal TR, the CPU 109 dispatches the flags, address field and control field to the FIFO 110B.

The frame transmitter 105B consists of a bit assembly circuit 71 which converts bytewise parallel data read out of the FIFO 110B into serial data, inserts filler bits of "0" so that transmission data in the information field is recognizable as data with certain significance and appends the FCS field so as to complete a frame of fields arrangement as shown in FIG. 2, transmission control circuit 72 which monitors the control signals and transmission status of the whole transmission section including the bit assembly circuit 71 to produce the transmission status signals for each transmission frame and the interrupt signal TSTT to the CPU 109, and determines the priority of transmission according to the SAPI (service access point) value in the address field of transmission frame, FIFO status registers 73 for holding the transmission status signals for the transmission frames, and an FIFO cleaner 74 which clears a frame of transmission data in the FIFO 110B at the occurrence of transmission error. Upon receiving the interrupt signal TSTT, the CPU 109 analyzes the status signals in the status registers 73 and carries out the appropriate process.

Moreover, in this embodiment, when the DMA transfer controller 107B has detected that the data transferred from the data buffer is the last data to be entered in the information field, it produces the final bit FB and enters it with the last data into the FIFO 110B. The DMA transfer control 107B, upon detecting a transmission suspension event such as bus error on the part of the host computer, produces an abort bit AB and enters it in the FIFO 110B.

In response to the read out of the final bit FB from the FIFO 110B, the frame transmitter 105B takes a normal termination for the frame transmission, or if the abort bit AB is detected it suspends frame transmission and immediately proceeds to a certain operation, e.g., it sends an abort sequence of consecutive "1"s bits of 7 or more and 14 or less to the communication circuit, and sends the interrupt signal TSTT to the CPU 109.

Furthermore, in this embodiment, if channel conflict is detected on the part of a communication line, the frame transmitter 105B halts the transmission immediately and, after issuing the interrupt signal TSTT to the CPU 109, activates the FIFO cleaner 74. The CPU 109 analyzes the status registers 73 for the cause of interrupt, and issues a halt command to the DMA transfer controller 107B. The DMA transfer controller 107B halts after sending data with the final bit FB appended thereto to the FIFO 110B. Upon detecting the final bit FB in the FIFO 110B, the FIFO cleaner 74 indicates it to the frame transmitter 105B, and then halts.

Also in the sending data transfer unit of this embodiment, as described above, when the last data of a frame has been transmitted, the operation of the frame transmitter 105B is halted by the final bit appended to the data, whereby the load of the CPU 109 is reduced. In addition, in this embodiment, when a transfer error such as a bus error caused by the host computer, the frame transmitter 105B is halted by the abort bit AB provided by the DMA transfer controller 107B, without the intervention of the CPU 109, whereby the load of the CPU 109 is further reduced.

As described above, in the foregoing embodiment, the communication control unit consists of the communication control circuit for implementing serial communication control in compliance with the communication protocol, the first-in-first-out buffer memory 110 for temporarily holding transmission/reception data, the DMA control circuit for implementing DMA data transfer to the data buffer (main memory 102) of the host computer, and the controller (CPU) for implementing general control over these circuits, wherein the signal indicating the end of frame (transaction data) is passed between the serial communication control circuit and the DMA control circuit, whereby the receiver (serial communication control circuit or DMA control circuit) can halt the data transferring operation automatically upon detecting the signal attached to the data without the need of controller intervention, whereby the load of the micro controller is reduced and the protocol processing speed is enhanced.

Although the present invention has been described for the specific embodiment, the invention is not confined to the foregoing embodiment, but various changes are possible without departing from the scope of its substantial matter. For example, in the foregoing embodiment, the communication control unit is formed on a single LSI chip inclusive of the reception controller, receiving FIFO, sending FIFO and DMA transfer controller, the invention is also applicable to the case where the frame transmitter-receiver (SIO), FIFO and DMA transfer controller are formed on separate LSIs.

Although the embodiment has been described as an example for the application to the serial communication complying with the SDLC protocol, the communication protocol is not limited to SDLC, but the invention can equally be applied to arbitrary protocols.

Although the present invention has been described for the case of application to the communication control unit which is the background utilization field of the invention, the invention is not confined to this, but it can also be utilized for control systems including a plurality of control LSIs under control of a microprocessor.

The paramount improvement of this invention is the reduction of microprocessor processing necessary in communication control units which constitute a local area network. This reduction increases the protocol processing speed of the network.

What is claimed is:

1. A communication interface apparatus comprising:
    a means for receiving serial data from a first associated external device and converting the received serial data into parallel data for processing in a host system;
    a means for converting processed parallel data of the host system into serial data and transmitting the serial data to the first associated external device;
    a means for controlling the reception of serial data from the first associated external device to produce reception status signals and interrupt signals and for controlling the transmission of serial data to the first associated external device to produce transmission status signals and interrupt signals, the controlling means being operatively connected to the receiving and converting means and converting and transmitting means wherein said means for controlling the reception and transmission of serial data includes a first detecting means for selectively detecting a first end of data indicator and a second means for selectively generating a second end of data indicator, the second means being operatively connected to the receiving and converting serial data means, and the first detecting means being operatively connected to the converting and transmitting serial data means;
    a first storing means for storing the converted parallel data transferred from the receiving and converting serial data means and for storing the processed parallel data transferred from a host system main memory; and,
    a means for controlling the transfer of the converted parallel data from the first storing means to the main memory, and for controlling the transfer of the processed parallel data from the main memory to the first storing means, the transfer controlling means being operatively connected to the means for controlling the reception and the transmission of the serial data and the first storing means, the transfer controlling means including a third means for selectively generating the first end of data indicator and a fourth means for selectively detecting the second end of data indicator, the third means being operatively connected to the first detecting means, the fourth means being operatively connected to the second means, wherein the transfer controlling means terminate transfer of the converted parallel data from the first storing means to the main memory upon receiving a signal from the second means when a second end of data indicator has been detected.

2. A communication interface apparatus according to claim 1, wherein the converting and transmitting means terminates transfer of the processed parallel data from the first storing means to the first associated external device upon receiving a signal from the first detecting means when a first end of serial data indicator has been detected.

3. A communication interface apparatus according to claim 2, wherein the second means generates an abort transmission indicator comprising a bit signal which is appended to the processed parallel data transferred from the main memory to the first storing means, the abort transmission indicator is generated when the transfer controlling means detects an error in the transfer of data from the main memory to the first storing means.

4. A communication interface apparatus according to claim 3, wherein the controlling means further comprises a second storage means for storing control data, a third storage means for storing communication protocol instructions and a means coupled to the second and third storage means for executing the communication protocol instructions.

5. A communication interface apparatus according to claim 4, wherein the second means generates the second end of data indicator when the receiving and converting means completes transfer of the converted data to the first storing means, the second end of data indicator being appended to the converted data as a bit signal, and the third means generates the first end of data indicator when the transfer of the processed parallel data from the main memory to the first storing means is complete, the first end of serial data indicator being appended to the processed parallel data as a bit signal.

6. A communication interface apparatus according to claim 5, wherein the receiving and converting means, the converting and transmitting means, the transfer controlling means, the controlling means, the first storing means and both detecting and generating of end of serial data indicator means are fabricated on the same semiconductor substrate.

7. A method of improved protocol processing in a computer system having a host processor, a main memory, and a communication control microcomputer including a central processing unit for reducing central processing unit intervention at each transmission or reception of a frame data to the main memory to or from another processor comprising the following steps:
    serially receiving data frames at the communication control microcomputer from the other processor;
    converting the serial data into parallel data and storing the converted data in a memory means;
    appending an end-of-data indicator to the stored parallel data indicating a last data bit in a frame of serial data; and,
    transferring the stored data from the memory means to the main memory by a direct memory access controller until the direct memory access controller recognizes the end-of-data indicator and halts transfer, thereby avoiding intervention of the central processing unit in halting the transfer.

8. The method of claim 7, wherein the step of converting and storing includes a step of serially storing the converted data with respect to one data frame so that the converted data stored in the memory means first is output first.

9. A method of improved protocol processing in a computer system having a host processor, a main memory, and a communication control microcomputer including a central processing unit for reducing central processing unit intervention at each transmission or reception of frame data to the main memory to or from another processor comprising the following steps:

transferring data from the main memory by a direct memory access controller and storing the data in a memory means as stored data;

appending an end-of-data indicator to the stored data indicating a last data bit for a frame of the frame data;

converting the stored data into serial data at a frame transmission controller and transmitting the converted data to the other microprocessor; and, halting the transmitting upon recognizing the end-of-data indicator by the frame transmission controller thereby avoiding intervention of the central processing unit.

10. The method of claim 9, further including an abort indicator to the stored data indicating when an error has occurred in the transfer of data from the main memory by the direct memory access controller.

11. A communication control apparatus comprising:

a receiver to receive serial data forming a frame and converting part of the serial data into parallel data, the receiver further including first means for producing first information indicating reception of the frame, and second means for producing second information indicating termination of the frame, the frame having a start flag which indicates a start of the frame, an end flag which indicates an end of the frame, and an information field which is disposed between the start and end flags and which includes data to be converted into parallel data, the data in the information field having last data to be converted into the parallel data finally;

a FIFO memory for storing each of the parallel data and the second information therein;

storing means for storing contents of the FIFO memory;

a DMA controller for reading out the contents of the FIFO memory so as to control transfer of the contents of the FIFO memory to the storing means;

a central processing unit reponsive to the first information for activating the DMA controller to start operation of the DMA controller; and, wherein the DMA controller halts its operation in response to receipt of the second information, irrespective of a command from the central processing unit, when the DMA controller reads out both the last data and the second information from the FIFO memory and transfers the last data to the storing means.

12. A communication control apparatus according to claim 11, wherein the receiver, the FIFO memory, the DMA controller, and the central processing unit are formed on a single-chip semiconductor substrate, and wherein the storing means is externally coupled to the singlechip semiconductor substrate.

13. A communication control apparatus according to claim 11, wherein the receiver converts the data in the information field into the parallel data, byte by byte.

14. A communication control apparatus according to claim 13, wherein the FIFO memory includes a plurality of stages, each of which stores the parallel data in a byte therein.

15. A communication control apparatus according to claim 14, wherein the FIFO memory stores the parallel data with respect to one frame in a series therein.

16. A communication control apparatus for transmitting serial data forming a frame comprising:

storing means for storing data to be included in part of the frame, the data having last data to be included in an end of the part of the frame;

a FIFO memory for storing parallel data transferred from the storing means;

a DMA controller for controlling transfer of the data in the storing means to the FIFO memory, the DMA controller being responsive to the last data and producing a control signal and sending the control signal to the FIFO memory to store the last data with the control signal in the FIFO memory;

a central processing unit for activating the DMA controller to start operation of the DMA controller; and, a transmitter to receive output data of the FIFO memory for providing the serial data forming the frame, the frame having a start flag indicating a start of the frame, and an end flag indicating an end of the frame, wherein the transmitter forms the end flag to indicate termination of the frame when the transmitter receives both the last data and the control signal from the FIFO memory and terminates data transfer in response to the control signal.

17. A communication control apparatus according to claim 16, wherein the FIFO memory, the DMA controller, the central processing unit, and the transmitter are formed on a single-chip semiconductor substrate, and wherein the storing means is externally coupled to the single-chip semiconductor substrate.

* * * * *